(12) United States Patent
Friesel

(10) Patent No.: US 7,283,938 B1
(45) Date of Patent: Oct. 16, 2007

(54) VIRTUAL SENSOR FOR DATA AND SENSOR FUSION

(75) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/356,670

(22) Filed: Feb. 16, 2006

Related U.S. Application Data

(63) Continuation-in-part of application No. 10/826,241, filed on Apr. 15, 2004, now Pat. No. 7,047,161.

(51) Int. Cl.
*G06F 15/00* (2006.01)

(52) U.S. Cl. ..................... 702/189; 702/191

(58) Field of Classification Search ............. 702/104, 702/188, 182, 190, 191, 189; 356/73.1, 106; 455/226.3
See application file for complete search history.

(56) References Cited

U.S. PATENT DOCUMENTS

| 5,999,893 | A | 12/1999 | Lynch, Jr. et al. ........... 702/181 |
| 6,889,171 | B2 * | 5/2005 | Skrbina et al. ............. 702/187 |
| 6,909,997 | B2 | 6/2005 | Chen et al. ................. 702/189 |
| 2003/0186663 | A1 | 10/2003 | Chen et al. ............... 455/226.3 |
| 2003/0191610 | A1 | 10/2003 | Chen et al. ................. 702/191 |

* cited by examiner

*Primary Examiner*—Bryan Bui
(74) *Attorney, Agent, or Firm*—Duane Morris, LLP

(57) ABSTRACT

A plurality of sensors observe an object, and the raw sensor data is processed to produce evidence signals representative of characteristics which may be used to classify the object as to type. The sensor response characteristics from the plurality of sensors are fused to generate fused or combined sensor response characteristics. Thus, the fused or combined sensor response characteristics are equivalent to the sensor response characteristics of a virtual sensor. The evidence and fused sensor response characteristics are applied to a taxonomic classifier to determine the object type.

5 Claims, 4 Drawing Sheets

VIRTUAL SENSOR FOR DATA AND SENSOR FUSION

This application is a continuation-in-part application of U.S. application Ser. No. 10/826,241, filed on Apr. 15, 2004 now U.S. Pat. No. 7,047,161.

FIELD OF THE INVENTION

This invention relates to fusion of information from sensors for the purpose of classifying objects or conditions observed by the sensors.

BACKGROUND OF THE INVENTION

The use of sensors to determine the nature or classification of objects is old. Such sensors receive raw data from an observed direction or space in either a passive or active manner, and process the information according to the response characteristics of the sensors and some algorithm in order to make a determination of the nature of the object or condition. For example, a radar system operating as an active sensor may transmit radar signals in a desired direction, and then processes signals returned from a target to determine various characteristics of the received signal in order to characterize the target as, say, an F-15 fighter aircraft rather than a C-130 transport aircraft. A passive sensor might detect the emissions of an active sensor carried by a remote platform, determine the type of sensor detected, and identify platforms capable of carrying such an active sensor.

A great deal of work has been done in the field of fusion of the outputs of various sensors associated with a battle region, in order to rationalize the results of the many sensors observing the region from different vantage points under different operating conditions.

Improved or alternative fusion is desired.

SUMMARY OF THE INVENTION

A method for fusing information from at least first and second sensors, the method comprising the steps of fusing the response characteristics from the first and second sensors to produce compound sensor response characteristics. The method also comprises the step of observing an object with the first and second sensors. Each of the first and second sensors independently (a) evaluates evidence or information and (b) based on the evidence or information, assigns a taxonomic (type) classification to its observation of the object. A classification of the object is also made based on the evidence and the compound sensor response characteristics.

In a particularly advantageous mode of the method, the classification assigned to the object based on the evidence and the compound sensor response characteristics is a taxonomic classification. The sensors are preferably spatially separated.

A method according to another aspect of the invention is for fusing response characteristics from plural sensors. This other method comprises the step of fusing the response characteristics from the first and second sensors to produce compound sensor response characteristics. The method further comprises observing an object with at least first and second sensors to thereby generate evidence or information, each of first and second sensors (a) evaluates said evidence or information and (b) based on said evidence or information, assigns a taxonomic classification to its observation of the object. The method further comprises the step of assigning a classification to the object based upon the compound response characteristics and (a) the unfused evidence or information, and or (b) taxonomic classifications. In a particular embodiment of the invention, the classification based on compound response characteristics is taxonomic or type classification.

DESCRIPTION OF THE INVENTION

Figure 1:
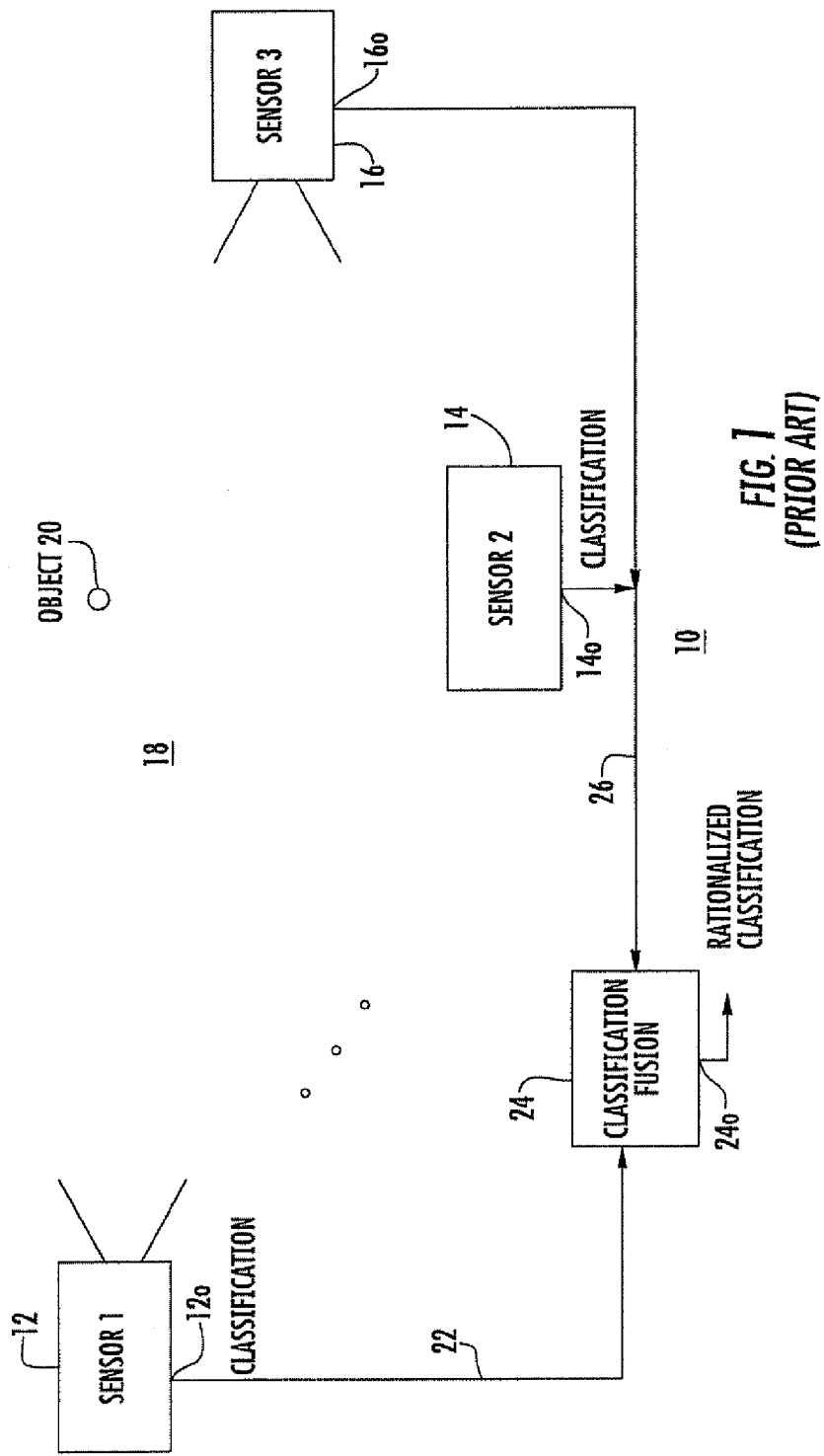
FIG. 1 is a simplified block diagram of a prior-art multiple-sensor fusion arrangement.

In FIG. 1, a system 10 includes a first sensor 12, a second sensor 14, and a third sensor 16, each observing a region designated generally as 18 which happens, at the illustrated time, to contain an object 20. For definiteness, the region 18 may be considered to be a region near a battlefield, object 20 may be an aircraft, and each of sensors 12, 14, and 16 may be any type of active or passive sensors used to detect and classify aircraft. The classification produced by sensor 1 is reported at an output port 12o, and is coupled by any means, illustrated as a hard-wired path 22, to a classification fusion function illustrated as a block 24. Similarly, sensors 14 and 16 each generate a classification or determination of the type of object at their output ports 14o and 16o, and these determinations are coupled to block 24 by any means, which in FIG. 1 is illustrated as a hard-wired path 26.

In the prior-art arrangement of FIG. 1, classification fusion arrangement 24 performs processing in known manner to rationalize the determinations made by the various sensors. As a simple example, if a large number of sensors report that object 20 is an F-16 aircraft, and one sensor reports that it is a battleship flying at altitude, block 24 may reject the battleship classification and produce a rationalized classification at its output port 24o to the effect that the object 20 is an F-16.

Figure 2:
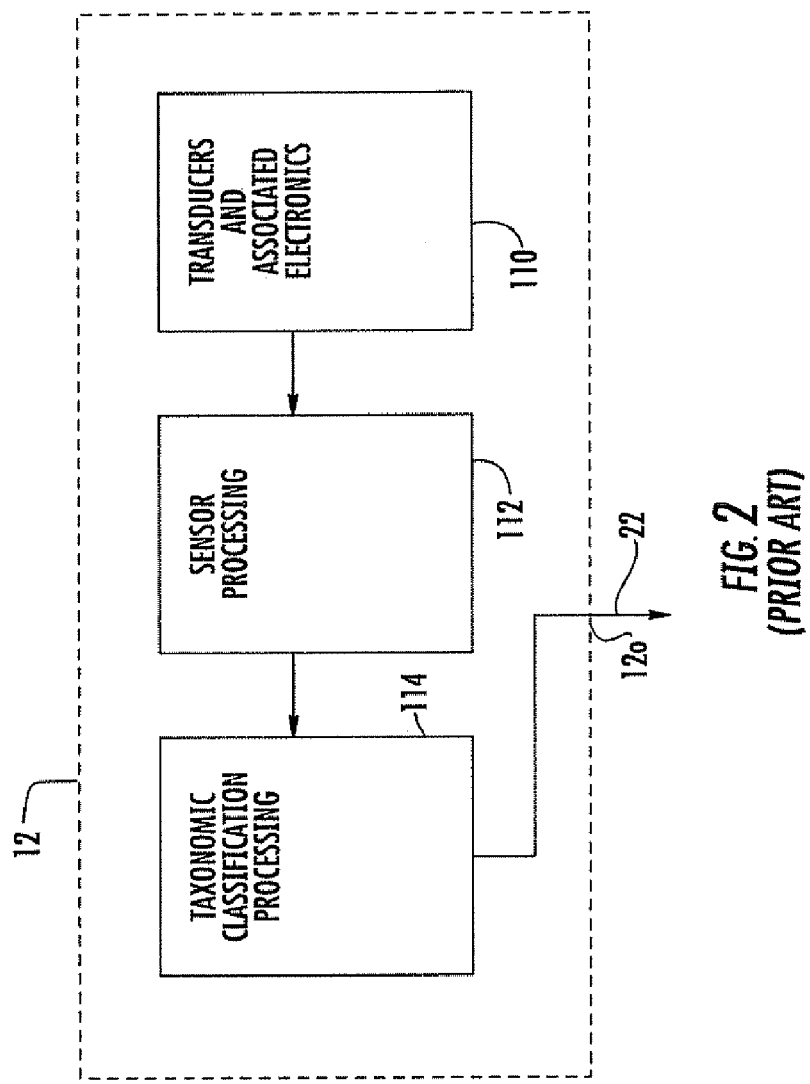
FIG. 2 is a simplified block diagram of a prior-art sensor of FIG. 1, showing how evidence provides the basis for taxonomic classification.

In FIG. 2, exemplary sensor 12 is illustrated as including a block 110 representing one or more transducers with their associated electronics. This might be, for example, the antenna, transmitter, and receiver of a radar system in the context of an active sensor, or a staring array and its amplifiers in the context of a heat sensor.

The signals representing raw information about the object sensed are applied from block 110 of FIG. 2 to a block 112, which represents processing performed by the sensor on the raw data to generate information which allows classification of the type of object. This processing might be spectral processing of the received signal in the case of a radar system. The processing might also include decoding and information processing in the case of intercepted data or voice transmissions, shape estimation in the case of imaging sensors, kinematic information such as acceleration, and the like.

The evidentiary information produced by block 112 of FIG. 2 is applied to a taxonomic (type) classification block 114, which makes a determination of the object type by comparing the evidence with stored information relating to the characteristics of the evidence for various types of objects. The final classification is output from port 12o for transmission over path 22.

Figure 3:
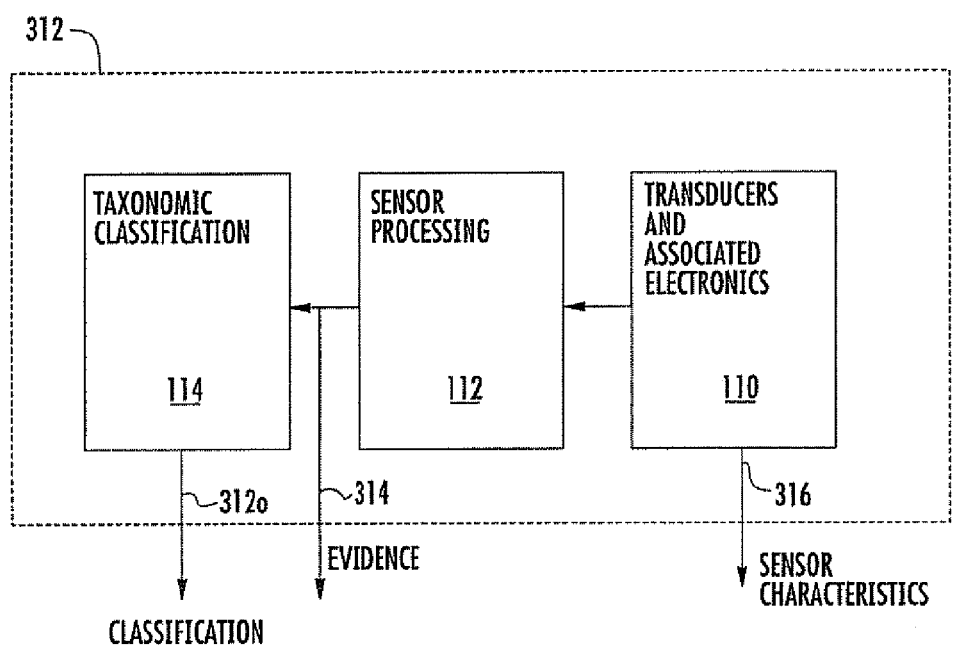
FIG. 3 is a simplified block diagram of a sensor according to an aspect of the invention, showing that the sensor characteristics are available externally as well as the unfused evidence and the taxonomic classification.

In FIG. 3, elements corresponding to those of FIG. 2 are designated by like reference numerals. In FIG. 3, a sensor 312 according to an aspect of the invention produces its taxonomic classification at an output port 312o, also includes a further output port 314 at which the evidence used by taxonomic classification block 114 can be accessed, and furthermore contains an output port 316 by which sensor response characteristics may be accessed. As an example, an infrared sensor may measure temperature T belonging to evidence class $E_1$ encompassing a temperature between 700 and 750 degrees Celsius, for 90% of the F-111s that it observes, so that the sensor response characteristic p($E_1$|F-111)=0.90. The characteristic may be determined from sensor design considerations or from calibration and testing. Other evidence classes may be $E_0$ encompassing 600 to 699 degrees Celsius with p($E_0$|F-111)=0.03, and $E_2$ encompassing 751 to 780 degrees Celsius with p($E_2$|F-111)=0.07. An alternative sensor may measure peak frequency of a spectral response, and obtain $E_1$=500+/−50 Hz when a MiG 29 is observed with probability p($E_1$|MiG 29)=0.75, while $E_1$ is obtained from an A-10 with probability p($E_1$|A10)=0.20, and $E_1$ is obtained from a Piper Cub with probability p($E_1$|PiperCub)=0.02. Similar characteristics may exist encompassing other object types and taxonomies, and other evidence classes including continuous evidence.

Figure 4:
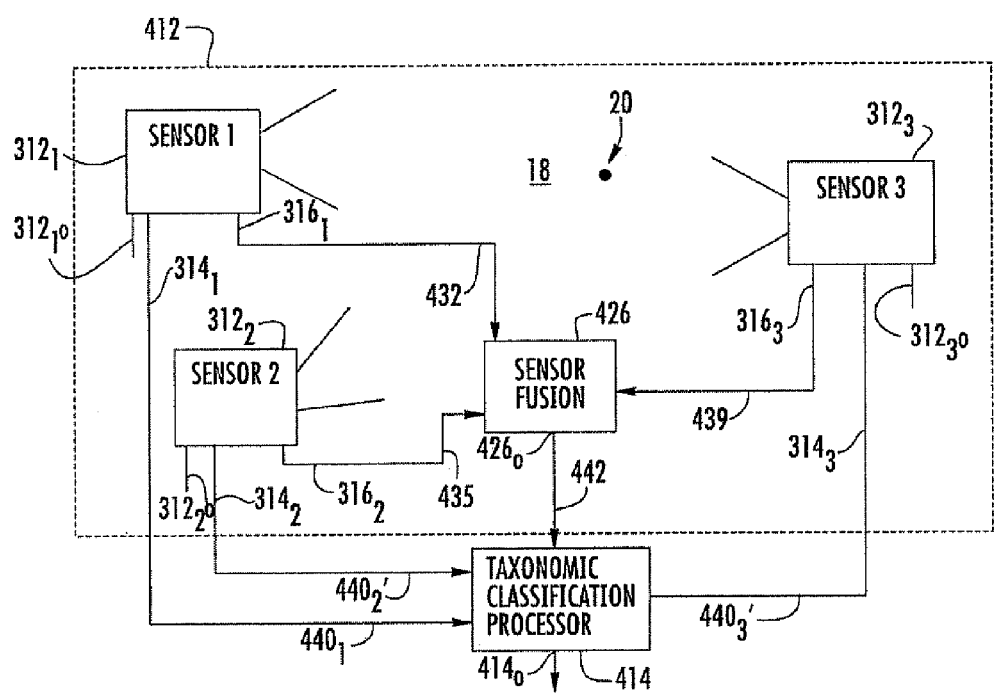
FIG. 4 illustrates a virtual sensor incorporating fused sensor characteristics from plural sensors, together with a taxonomic classifier operating on (a) the unfused sensor evidence or information, (b) the individual sensor taxonomic classifications, and (c) the fused sensor characteristics to classify the target or object.

In FIG. 4, first, second, and third sensors $312_1$, $312_2$, and $312_3$ are similar to sensor 312 of FIG. 3. Each of the three sensors of FIG. 4 observes object 20 in region 18. In addition to producing three classifications at output ports $312_1 o$, $312_2 o$, and $312_3 o$, the externally available sensor response characteristics available from ports $316_1$, $316_2$, and $316_3$ are coupled by paths, illustrated as hardwire paths 432, 435, and 439 to a sensor fusion block 426. The sensor fusion block 426 includes an output port 426o at which the fused sensor characteristics may be accessed. The sensor fusion block 426 produces fused sensor characteristics in any one of a variety of prior-art manners, to thereby effectively combine the sensor characteristics of sensors $312_1$, $312_2$, and $312_3$ into the equivalent of a single virtual sensor 412. The fusion of sensor characteristics may be carried out in real time, or may occur before any object is observed by the sensor. The externally available evidence from output ports $314_1$, $314_2$, and $314_3$ are coupled by paths, illustrated as hard-wired paths $440_1$, $440'_2$, and $440'_3$, respectively, and the fused sensor characteristics from output port 426o are coupled by a path, illustrated as a hard-wired path 442, to a taxonomic classification block 414. Taxonomic classification block 414 can be in accordance with any prior-art arrangement, and more specifically may be similar to blocks 112 and 114 of FIG. 2. Block 414 produces a taxonomic classification based on the evidence and the fused sensor characteristics, which becomes available at an output port 414o.

In general, the calculations are performed by letting the sensor characteristic p(E|a) be the likelihood that a sensor produces evidence E when an object that the sensor observes has a characteristic a. A typical sensor will be able to produce more kinds of evidence $E_n$, n=1, 2, 3, . . . when an object with characteristic a is observed. Let p($E_n$|a) be the likelihood that a sensor will produce evidence $E_n$ when an object observed by the sensor has a characteristic a. As a specific example, a sensor finds a dominant frequency of 100 KHz (kilohertz) when observing a J-100 aircraft engine, but may find a frequency of 120 KHz during the observation. The likelihood p(100 KHZ|J-100) of observing 100 KHz may be 0.95, and the likelihood p(120 KHz|J-100)=0.05. In general, objects may have different characteristics $a_k$, k=1, 2, 3, . . . A sensor may produce the same evidence $E_n$ when objects with different characteristics are observed. Let p($E_n$|$a_k$) be the likelihood that a sensor will produce evidence $E_n$ when an observed object has a characteristic $a_k$. As an example, a sensor may find a dominant frequency of 100 KHz when observing a J-100 engine, but may find the same frequency when observing a J-150 engine. The likelihood p(100 KHz|J-100) of observing 100 KHz may be 0.95, while the likelihood p(100 KHz|J-150) may be 0.40 (the sums need not add to 1.00). Let $p_j$($E_n$|$a_k$) be the likelihood that a sensor j produces evidence $E_n$ when an observed object has a characteristic $a_k$. The invention applies to any sensor, termed a "characterized" sensor, for which $p_j$($E_n$|$a_k$) is either known or can be estimated for one or more $E_n$ and one or more $a_k$. The p($E_n$|$a_k$) may be partially or wholly independent of any specific observation or measurement made by the sensor.

The classifications produced by sensors $312_1$, $312_2$, and $312_3$ may be used for other purposes or not used, as desired.

Other embodiments of the invention will be apparent to those skilled in the art. For example, while hard-wired paths have been illustrated for coupling the sensor characteristics from each sensor to a combiner, and from the combiner to the classifier, and from the sensors to the classifier, the paths may be, or include, wireless portions, or be encoded, or in general of any appropriate sort.

Thus, in a very general aspect of the invention, a plurality of sensors observe an object, the sensor characteristics are fused to generate fused or combined sensor characteristics, and the raw sensor data is processed to produce evidence signals representative of characteristics which may be used to classify the object as to type. Thus, the fused sensor characteristics are equivalent to the characteristics of a single virtual sensor. The evidence and fused sensor characteristics are applied to a taxonomic classifier to determine the object type. Put another way, a virtual sensor according to an aspect of the invention incorporates fused sensor characteristics from plural sensors, together with a taxonomic classifier operating on (a) the unfused individual sensor evidence or information, (b) the individual sensor taxonomic classifications, and (c) the fused sensor characteristics, and classifies the target or object. While only three sensors have been illustrated in the arrangement of FIG. 4, any number of sensors may be included.

More particularly, a method according to an aspect of the invention is for fusing information from plural sources ($312_1$, $312_2$, and $312_3$). The method comprises the step of observing an object with at least first ($312_1$) and second ($312_2$) sensors, each of which (a) evaluates evidence or information and (b) based on the evidence, assigns a taxonomic classification to its observation of the object. The method further comprises the step of fusing the sensor characteristics (block 426) from the first and second sensors to produce compound sensor characteristics. The fusion of sensor characteristics may occur at any time prior to the combination of evidence and fused sensor characteristics. A classification is assigned (block 414) based on the evidence and compound sensor characteristics. In a particular embodiment of the invention, the classification based on compound evidence is taxonomic or type classification.

Fusion may be performed using any of a number of known methods including Bayes, Dempster-Shafer, evidence fusion, and other methods. An exemplary case is Bayes fusion resulting in probabilities $P(a|E_1,E_2)$ that a given object type a, and $P(b|E_1,E_2)$ that a given object type b, was observed when evidence $E_1$ results from the observation by sensor 1, and evidence $E_2$ results from the observation of the same object by sensor 2. No fusion of evidence from the actual observation is necessary, although additional fusion and other processing is not excluded.

What is claimed is:

1. A method for classifying an object observed by at least first and second sensors by fusing information from said at least first and second sensors, said method comprising the steps of:

fusing the response characteristics from the first and second sensors to produce compound sensor response characteristics;

observing an object with said first and second sensors, each of which sensors independently (a) evaluates evidence or information and (b) based on said evidence or information, assigns a taxonomic (type) classification to its observation of said object;

assigning a classification to said object based on said evidence and said compound sensor response characteristics to indicate the type of said object.

2. A method according to claim 1, wherein said classification assigned to said object based on said evidence and said compound sensor response characteristics is a taxonomic classification.

3. A method according to claim 1, wherein said sensors are spatially separated.

4. A method for classifying an object observed by at least first and second sensors by fusing information from said at least first and second sensors, said method comprising the steps of:

fusing the response characteristics from the first and second sensors to produce compound sensor response characteristics;

observing an object with said first and second sensors to thereby generate evidence or information, each of which sensors independently (a) evaluates said evidence or information and (b) based on said evaluation of said evidence or information, assigns a taxonomic (type) classification to its observation of said object;

assigning a classification to said object based on said compound sensor response characteristics and at least one of (a) unfused evidence or information from said first and second sensors and (b) unfused taxonomic information from said first and second sensors to indicate the type of said object.

5. The method of claim 4, wherein said sensors are spatially separated.

\* \* \* \* \*